(12) United States Patent
Ligertwood (10) Patent No.: US 7,261,261 B2
(45) Date of Patent: Aug. 28, 2007

(54) STAND OF FREE STANDING OR MOBILE TYPE

(76) Inventor: Peter Ligertwood, Unicol Engineering, Green Road, Headington, Oxford OX3 8EU (GB)

(*) Notice: Subject to any disclaimer, the term of this patent is extended or adjusted under 35 U.S.C. 154(b) by 0 days.

(21) Appl. No.: 10/521,956

(22) PCT Filed: May 20, 2004

(86) PCT No.: PCT/GB2004/002161

§ 371 (c)(1),
(2), (4) Date: Feb. 17, 2005

(87) PCT Pub. No.: WO2004/104472

PCT Pub. Date: Dec. 2, 2004

(65) Prior Publication Data

US 2005/0230573 A1    Oct. 20, 2005

(30) Foreign Application Priority Data

May 23, 2003  (GB) ................................. 0311945.0

(51) Int. Cl.
*A47K 1/04* (2006.01)
(52) U.S. Cl. .................................. 248/129; 248/917
(58) Field of Classification Search ............... 248/156, 248/127, 128, 129, 146, 158, 917; 211/103, 211/193
See application file for complete search history.

(56) References Cited

U.S. PATENT DOCUMENTS 5,918,841 A      7/1999 Sweere et al.
5,927,514 A *    7/1999 Linder ........................ 211/26
6,158,701 A *   12/2000 Deshler ..................... 248/127
6,439,515 B1 *   8/2002 Powers ...................... 248/129
2006/0104731 A1* 5/2006 Etter et al. ................... 408/16

FOREIGN PATENT DOCUMENTS

| DE | 4039550 | 6/1992 |
| DE | 19600001 | 7/1997 |
| DE | 19939884 | 3/2001 |
| WO | WO 01/35196 | 5/2001 |

* cited by examiner

*Primary Examiner*—Ramon O Ramirez
(74) *Attorney, Agent, or Firm*—Davis Bujold & Daniels, P.L.L.C.

(57) ABSTRACT

A stand comprising: a floor mount, a location mechanism for a unit to be supported; and at least one column extending between the floor mount to which it is attached by a first attachment and the location mechanism which is attached to, or integral with, an upper region of the or each column; the column having a longitudinal axis which is curved relative to a straight line extending between the first attachment and the location mechanism; the, or each, column serving to transmit loads applied to the stand by way of the location mechanism to the floor mount; the, or each, column comprising a hollow channel substantially symmetrical about the longitudinal axis of the front panel; the hollow spine having a cross section in the region of the floor stand which is greater than the cross section of the spine in the region of the location mechanism.

8 Claims, 12 Drawing Sheets

Right side elevation (left side corresponds)

Plan view from above

Rear view from left-hand side with plasma screen mounted

Fig. 12

STAND OF FREE STANDING OR MOBILE TYPE

This application is a national stage completion of PCT/GB2004/002161 filed May 20, 2004, which in turn claims priority from British Application Serial No. 0311945.0 filed May 23, 2003.

TECHNICAL FIELD

This invention relates to a stand. It is particularly concerned with a stand of a free standing or mobile type for supporting a relatively bulky object above floor or ground level while providing for stable directional alignment of the object relative to a datum direction from the stand.

There is a widespread and increasing need for mounting a display unit, such as a plasma screen, so that a number of people can readily comprehend information displayed by way of the unit. In the case of areas such as concourses, airport passenger areas, sporting arenas and stations a display unit can be raised well above the general eye level and mounted on an existing structure. However for other viewing situations there arises a need for a free standing stand which is readily located at will in order to support a display unit in a stable manner and at a height providing for unimpeded viewing by, say, visitors to exhibitions, seated individuals at a meeting, students under instruction or employees undergoing staff training. Such display locations, particularly when temporary, require the use of a display stand, which is either complete or readily assembled. The stand needs to be capable of ready location and removal or movement. In addition a display unit needs to be provided with one or more external link/s to a power and/or a data source. The presence of such a link or links should not present a hazard to individuals moving in the vicinity of the stand especially when ambient light levels are low. In addition the attachment and securing of such links should not adversely affect the stability of the stand. It is also desirable in many locations, particularly prestigious ones, that the overall appearance of the stand in use (along with any attachments and their means of attachment) should not present an untidy or ramshackle appearance.

DISCLOSURE OF INVENTION

According to a first aspect of the present invention there is provided a stand comprising:
 a floor mount,
 a location means for a unit to be supported; and
 at least one column extending between the floor mount to which it is attached by a first attachment and the location means which is attached to, or integral with, an upper region of the or each column; the column having a longitudinal axis which is curved relative to a straight line extending between the first attachment and the location means;
 the, or each, column serving to transmit loads applied to the stand by way of the location means to the floor mount; the, or each, column comprising a hollow channel substantially symmetrical about the longitudinal axis of the front panel; the hollow spine having a cross section in the region of the floor stand which is greater than the cross section of the spine in the region of the location means.

According to a first preferred version of the first aspect of the present invention the, or at least one, column comprises in combination:
 a front panel extending between floor mount and the location means and reducing in horizontal cross section in passing upwardly from the floor mount to the location means; the front panel having a longitudinal axis which is curved relative to a straight line extending between the first attachment and the second attachment; and
 a hollow spine of U-section channel attached to the front panel such that the front panel serves to close the U-section such that the front panel and the hollow spine in combination provide a column substantially symmetrical about the longitudinal axis of the front panel; the hollow spine having a cross section in the region of the floor stand which is greater than the cross section of the spine in the region of the location means.

According to a second preferred version of the first aspect of the present invention the, or at least one, column has a sequence of apertures along at least part of the length of a wall of the column channel to enable a cable to be readily inserted into and drawn along the channel so as to extend within the spine from an entry into the spine by way of an aperture in the sequence in the vicinity of the floor stand and to pass out of the column by way of an aperture in the sequence in the vicinity of the location means so as to provide for the cable to provide a shrouded path for data or power cable within the, or each, column having a sequence of apertures as aforesaid.

According to a third preferred version of the first aspect of the present invention or of any preceding preferred version thereof there is provided on the column in the vicinity of the location a coupling means including a socket or other supply termination for a power supply and/or a data coupling to enable a unit to be attached by means of attached to the locating means to be demountably attached to a power or data supply. Typically the coupling is fed power and/or data by way of at least one cable extending from the coupling along the column by way of the hollow spine.

According to a fourth preferred version of the first aspect of the present invention or of any preceding preferred version thereof the front panel incorporates at least one longitudinal slot extending through the panel; the slot having an edge on the side of the panel which extends contiguously with an outside of a side wall of the U-section channel such that a flat member inserted through the slot from the side of the panel on the opposite side to the side to which the spine is attached is enabled to pass through the slot and lie in contact with the side wall for support thereby over an extend contact area. Typically a shelf support extends through the slot for attachment to the spine; the support projecting outwardly from the front of the front panel to receive a shelf to support an item or item at a location beneath the location means.

According to a fifth preferred version of the first aspect of the present invention or of any preceding preferred version thereof the floor mount is demountably attached to the column by coupling means so that a floor mount having given outside dimension can only be attached to a column whose height is related to the outside dimensions of the floor mount so that the combination of the floor mount and the column can support an added display or other unit secured to the location means in a stable configuration without added support.

According to a sixth preferred version of the first aspect of the present invention or of any preceding preferred version wherein the floor mount is provided with wheels to enable the stand to be displaced by rolling on the wheels.

According to a second aspect of the present invention there is provided a display assembly comprising a display unit secured to the locating means of a stand as claimed in any preceding claim. Typically the display unit is a plasma screen.

BRIEF DESCRIPTION OF DRAWINGS

An exemplary embodiment of the invention will now be described with reference to the accompanying drawings of two embodiments of audio-visual equipment stand in respect of which.

(for a first embodiment)

MODES FOR CARRYING OUT THE INVENTION

First Embodiment

FIGS. 1 to 5 variously show a stand 11 comprising a floor mount 12, a location pad 13 for a unit to be supported; and a column 14 extending between the floor mount 12 to the location pad 13 which, in this case, is integral with the column 14. The column 14 serves to transmit loads applied to the stand 11 by way of the location pad 13.

The column 14 comprises in combination: a front panel 16 extending between floor mount 12 and the location pad 13. The front panel 16 reduces in horizontal cross section in passing upwardly from the floor mount 12 to the location pad 13. The front panel 16 has a longitudinal axis 16A that is curved relative to a straight line 16B extending between foot 17 of the column 14 and the location pad 13.

A hollow spine 20 of U-section channel is attached to the back of the front panel 16 such that the front panel 16 serves to close the U-section. The front panel 16 and the hollow spine 20 in combination provide column 14. The hollow spine 20 has a horizontal cross section in the region of the floor mount 12 that is greater than the cross section of the spine 20 in the region of the location pad 13.

Figure 4:
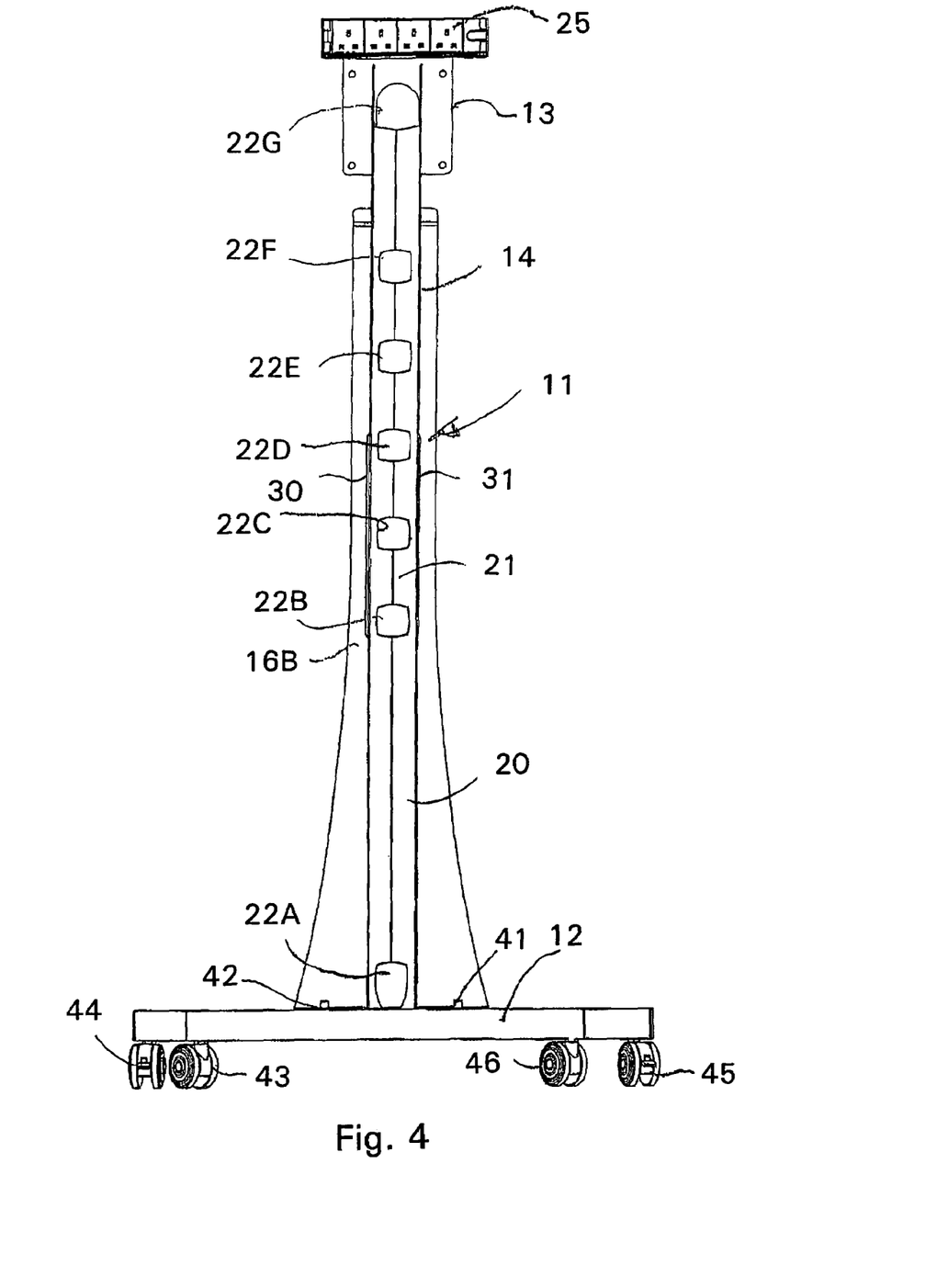
FIG. 4 is a rear elevation.
Figure 5:
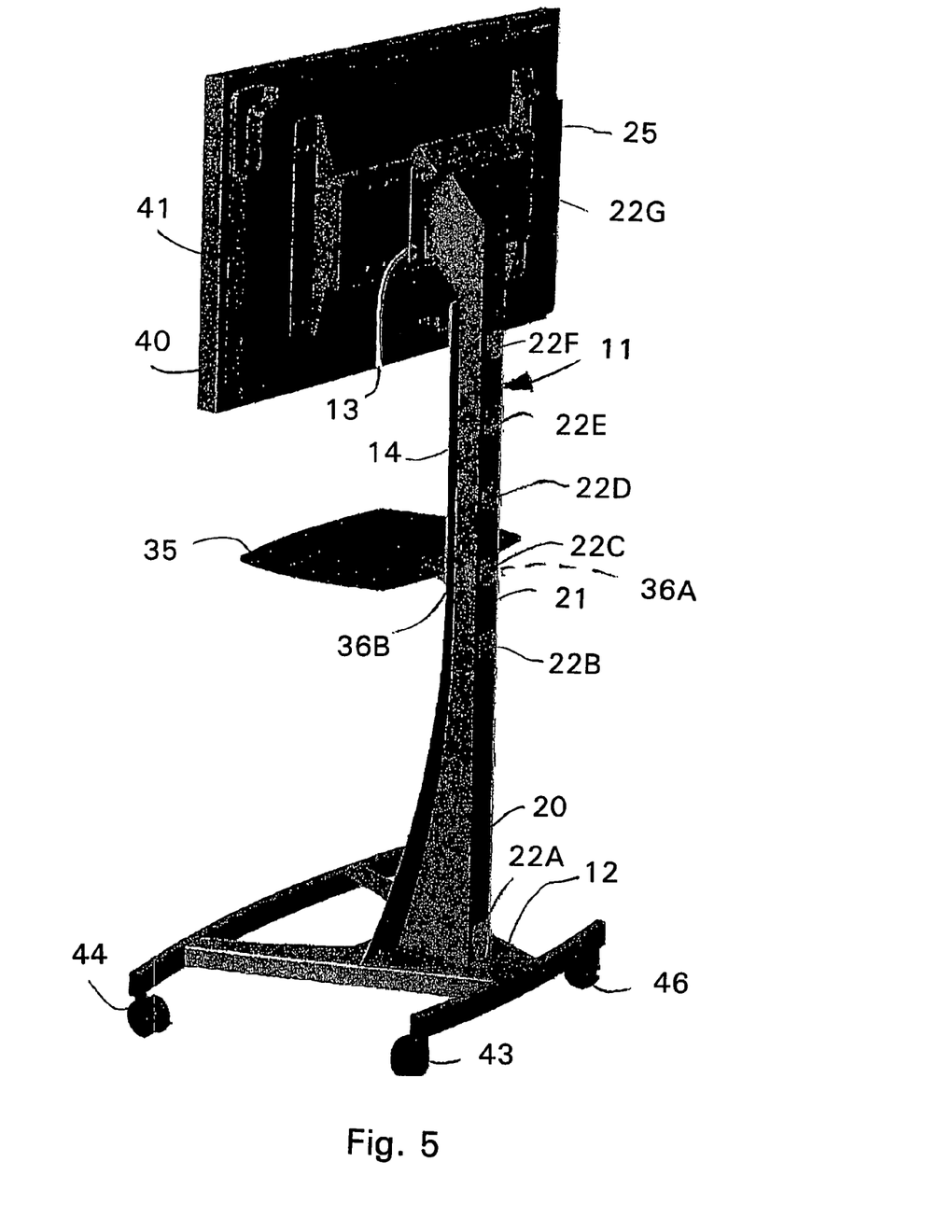
FIG. 5 is a view of the stand shown in FIGS. 1 to 4 with equipment mounted on it; and (for a second embodiment)
Figure 6:
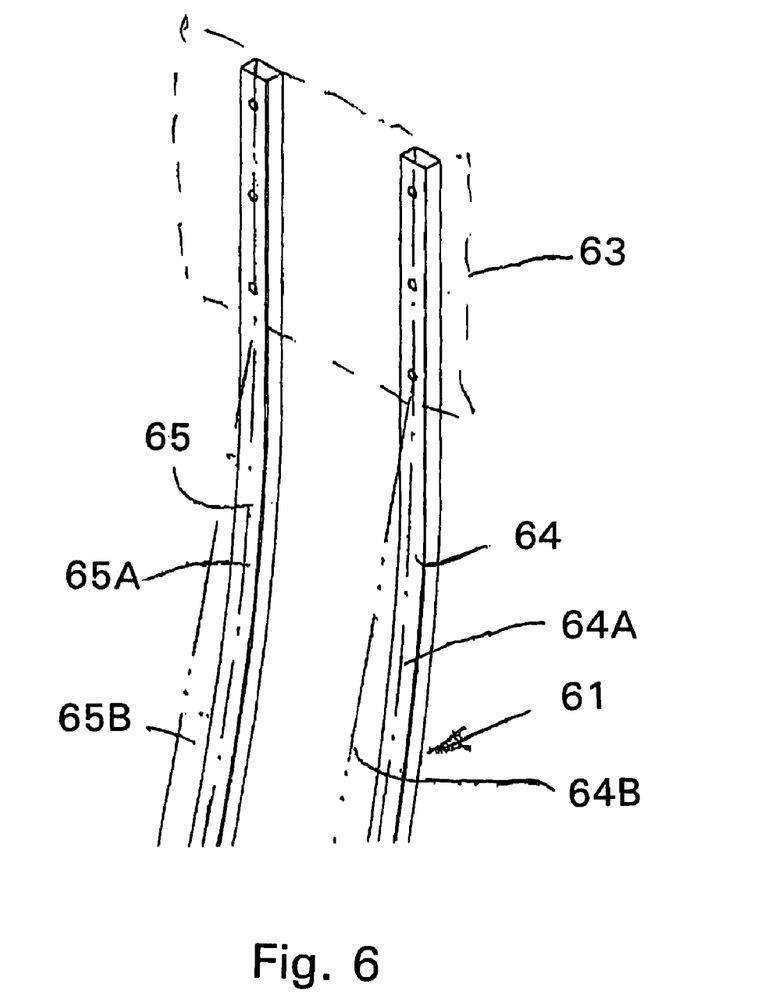
FIG. 6 is a front view from the left-hand side.
Figure 7:
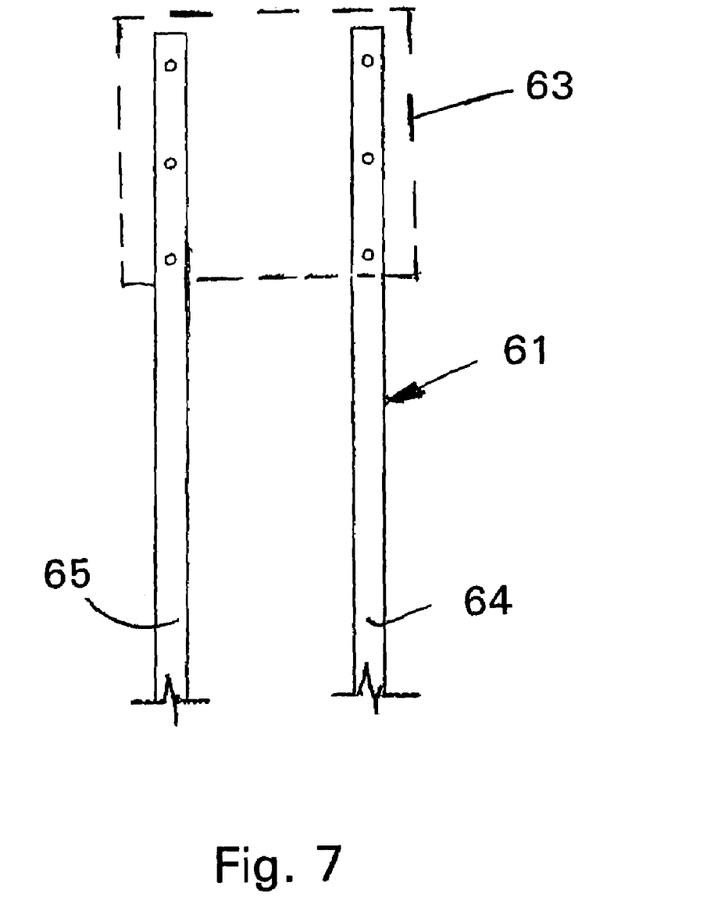
FIG. 7 is a front elevation.
Figure 8:
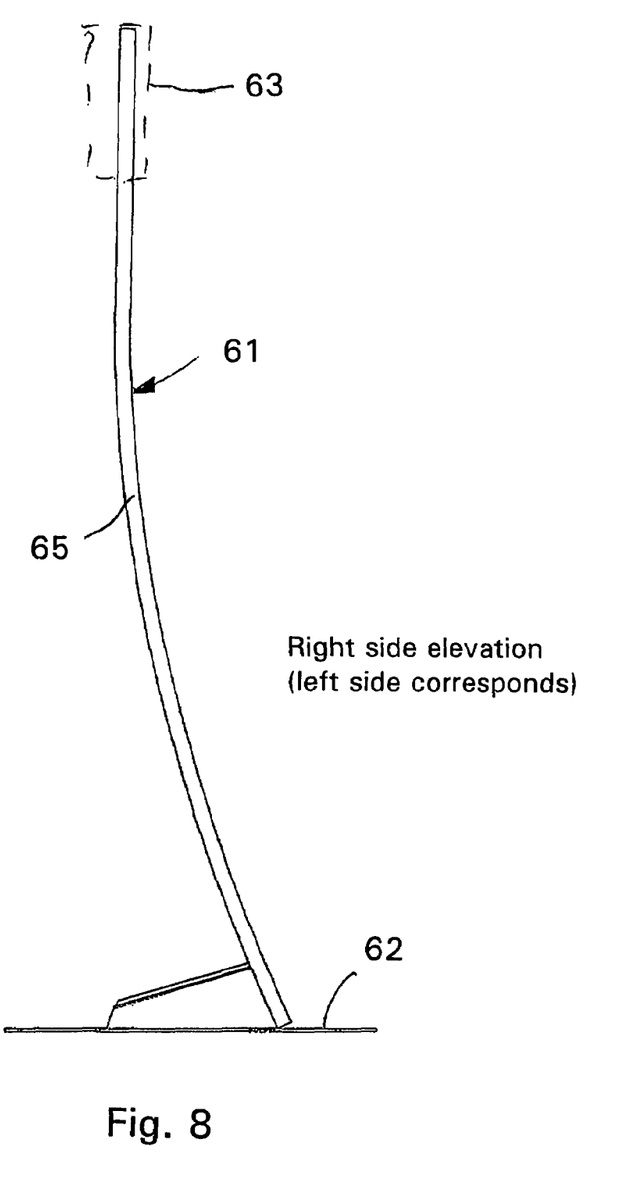
FIG. 8 is a side elevation.

Turning now to FIGS. 4 and 5 the hollow spine 20 has in its rear wall 21 a sequence of apertures 22A-G along the length of spine to enable one or more power cables to be readily inserted into and drawn internally along the spine 20 so as to extend within the spine from entry aperture 22A adjacent the floor mount 12 up the spine 20 to a terminal block 25 above the location pad 13. In this case the terminal block provides individual sockets 25A-25D. A similar path can be used to provide a route for data or other signal carrying cables which can enter at the entry aperture 22A or can enter at some intermediate point in the length of the spine 20 (such as from equipment mounted on a shelf described hereafter in connection with FIG. 5).

The front plate 16 of the column 14 is pierced by two vertical parallel slots 30, 31. These pass through plate 16 and open onto back 16B of the plate 16 close to a sidewall of the spine 20. In the case of slot 31 (FIG. 3) there is mounted on wall region W, of spine 20, adjacent to, and running the length of, the slot 31 a spaced sequence of pegs (34A-G). An adjacent vertical pair of pegs in the sequence serve to anchor a shelf 35 the in-board end of a support bracket 36A whose outboard end extends through the slot 31 to provide a support on the front of the column 14 for shelf 35. A matching shelf support 36B extends through slot 30 and is retained on the spine 20 in a way mirroring that of support bracket 36.

Figure 1:
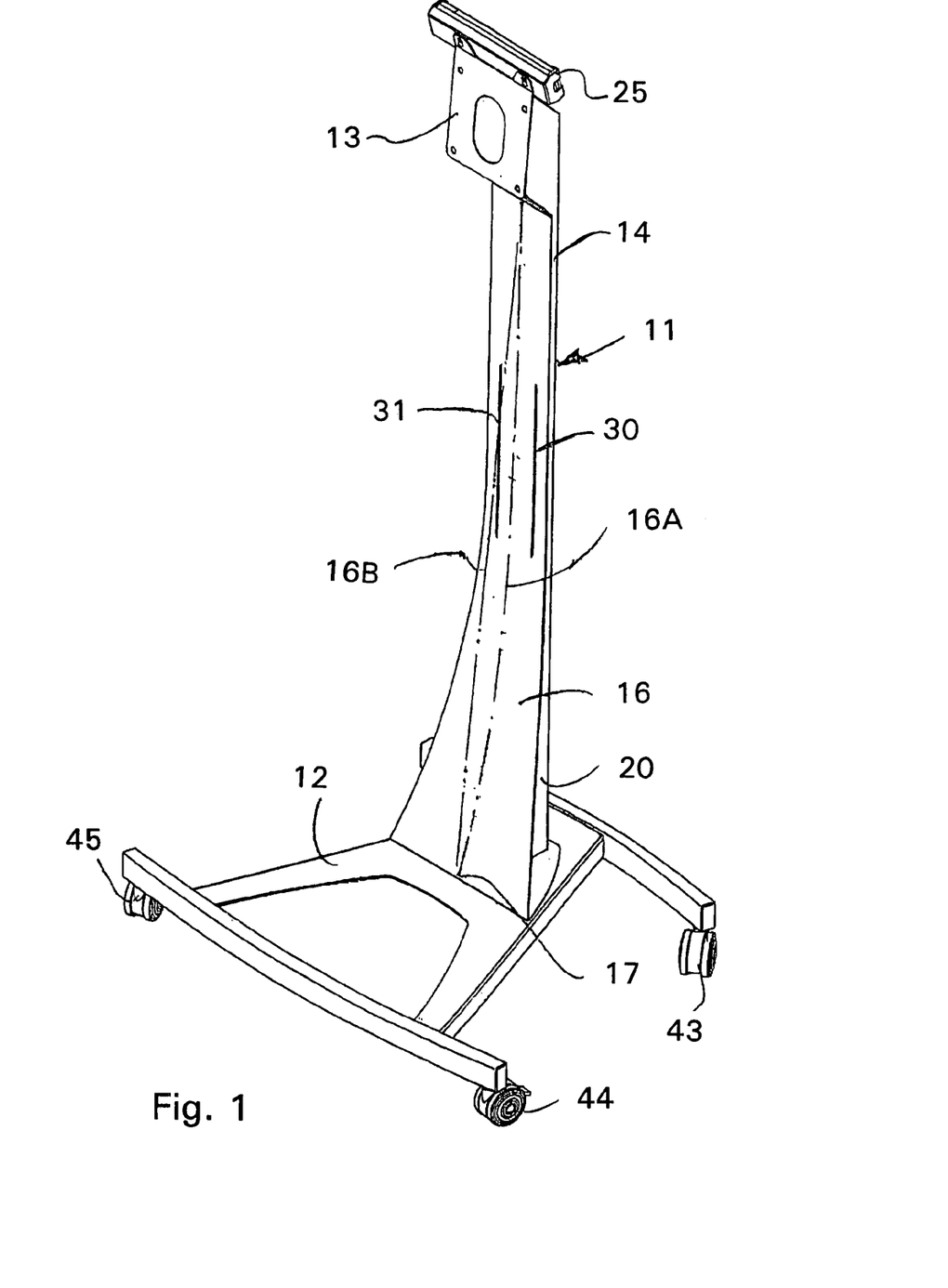
FIG. 1 is a front view from the left-hand side.
Figure 2:
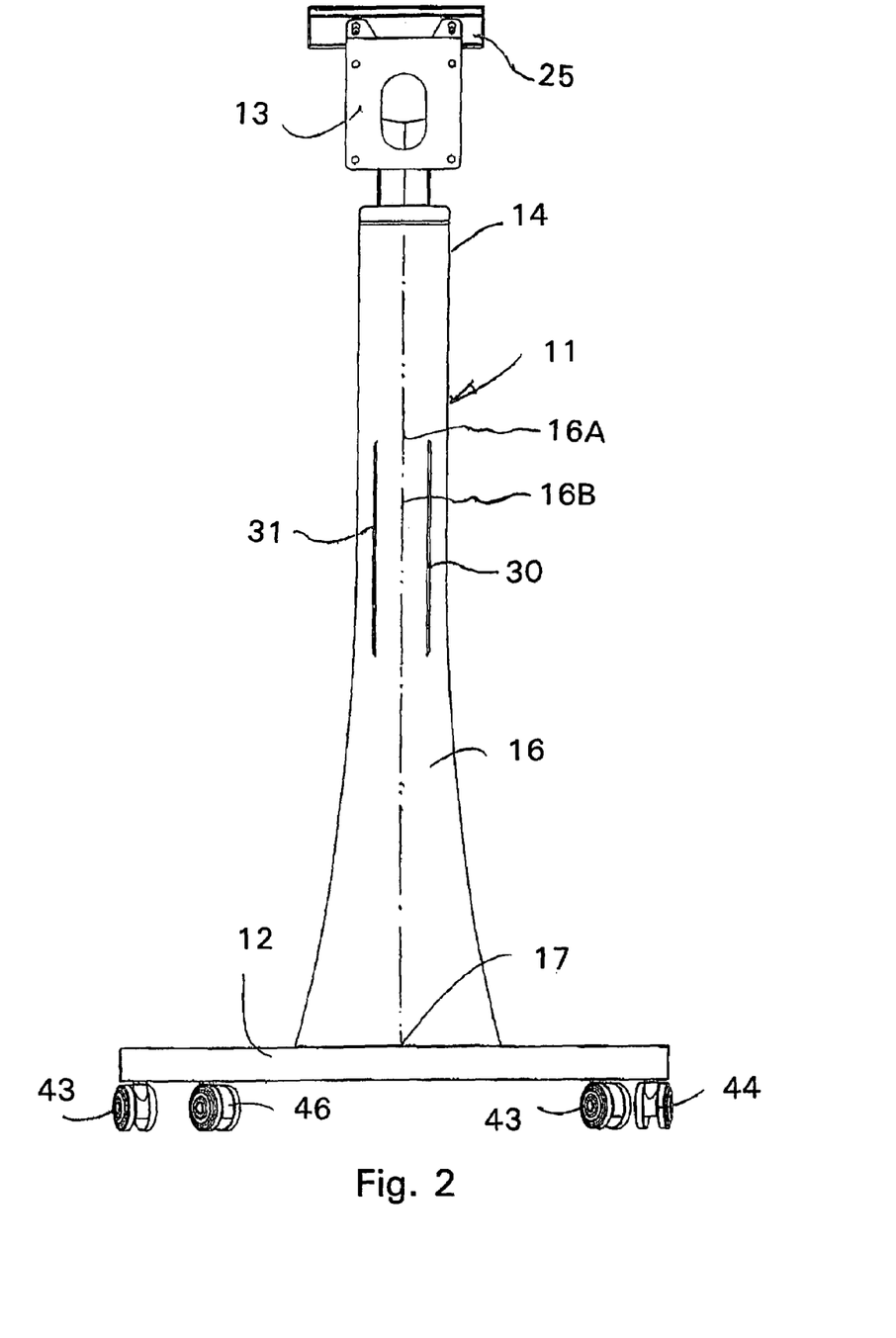
FIG. 2 is a front elevation.
Figure 3:
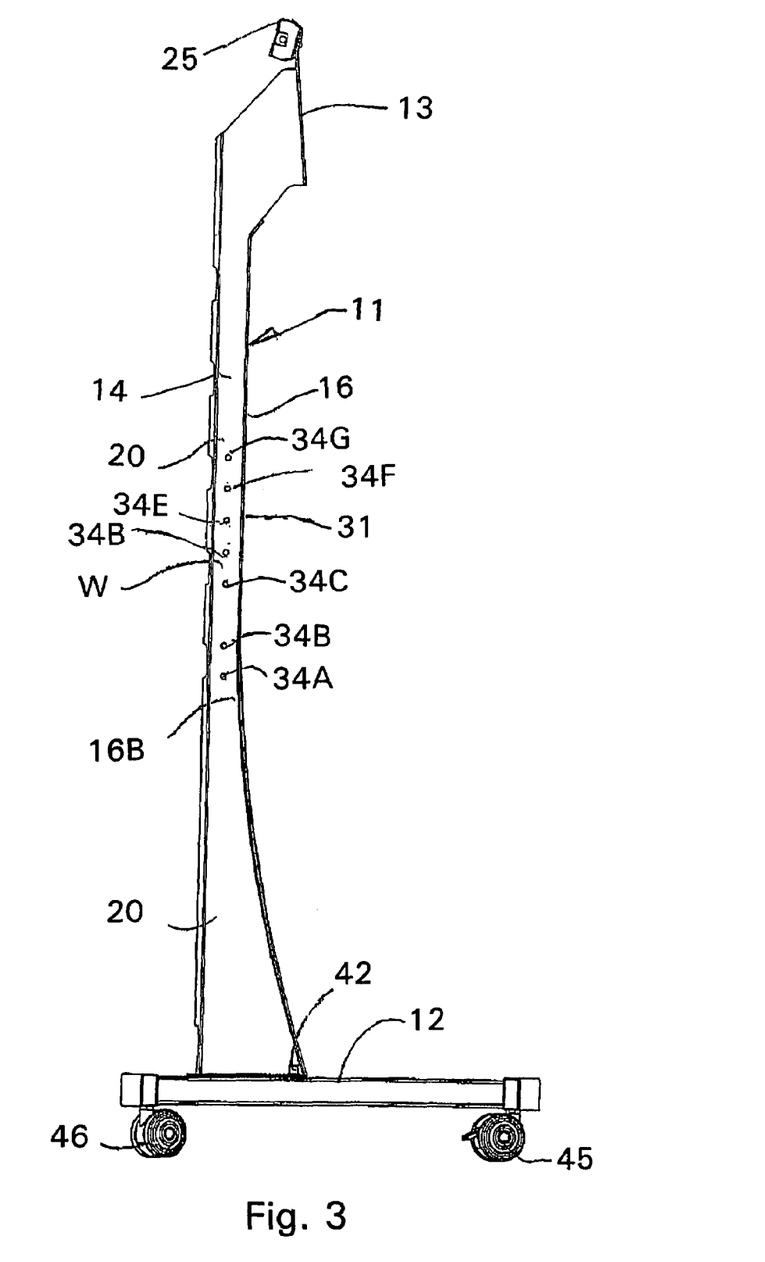
FIG. 3 is a side elevation.

The vertical separation of the pegs 34A-G is selected to ensure that despite the curvature of the column along wall region W the vertical separation of shelf 35 from any other shelf also located on the column is kept constant and the shelf is maintained horizontal. In this first embodiment it is provided so that up to three shelves can be located and used at any one time.

FIG. 5 shows a plasma screen 40 secured to the location pad 13 by way of a mounting frame 41.

The shelf 35 serves to support electronic equipment for use with the plasma screen 40 such as a video playback unit. Such a unit is readily powered from the terminal block 25 and the cable for this [purpose, as well as a data link cable from the recorder to the plasma screen, is readily and tidily housed in the spine 20 making use of one of intermediate apertures in the sequence aperture 22B to 22G.

In this first embodiment the column 14 is attached by projections (not shown) and bolts 41, 42 to the wheeled base 12. The location of castors 43-46 is selected to ensure that the center of gravity of the assembled stand and display unit lies well within the area bounded by the castors 43-46.

Second Embodiment

FIGS. 6 to 12 variously show a stand 61 comprising a floor mount 62, a location region 63 for a unit to be supported; and columns 64, 65 extending between the floor mount 62 to the location region 63. The column 64, 65 serves to transmit loads applied to the stand 11 in the location region 63.

In view of the identical form and function of columns 64, 65 in what follows the features of column 64 are described and components identified by a reference numeral. Following the reference numeral for column 64 the corresponding reference numeral for column 65 is shown in brackets but are not described further.

Column 64 (65) comprises a square section hollow tube. Column 64 (65) has a longitudinal axis 64A (65A) which is curved relative to a straight line 64B (65B) extending between foot 67 (68) of the column 64 (65) and the part of column 64 (65) lying in the location region 63. At foot 67 (68) of column 64 (65) there is provided an integral foot 70 (71).

Figure 9:
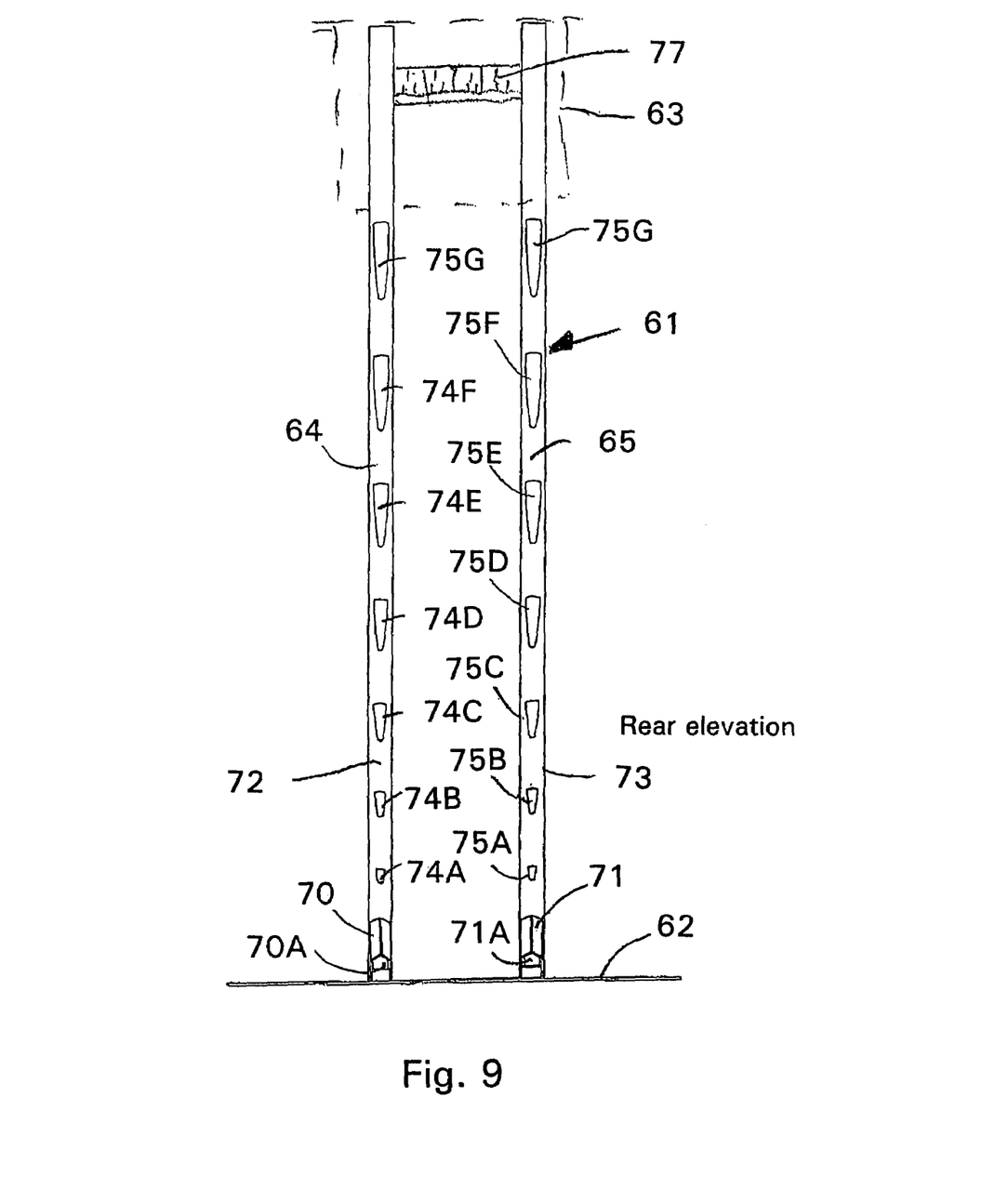
FIG. 9 is a rear elevation.
Figure 10:
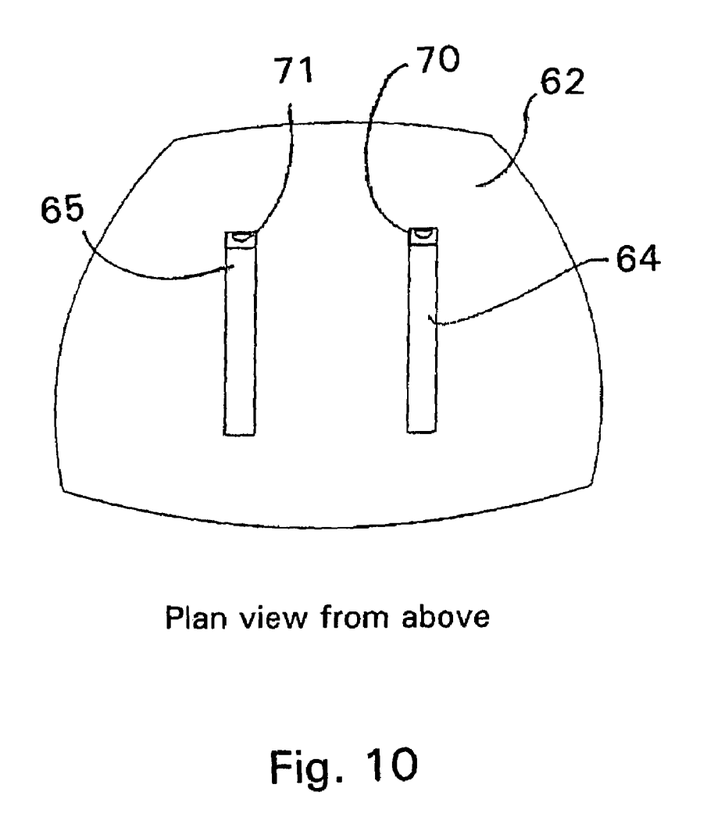
FIG. 10 is a plan view from above.
Figure 12:
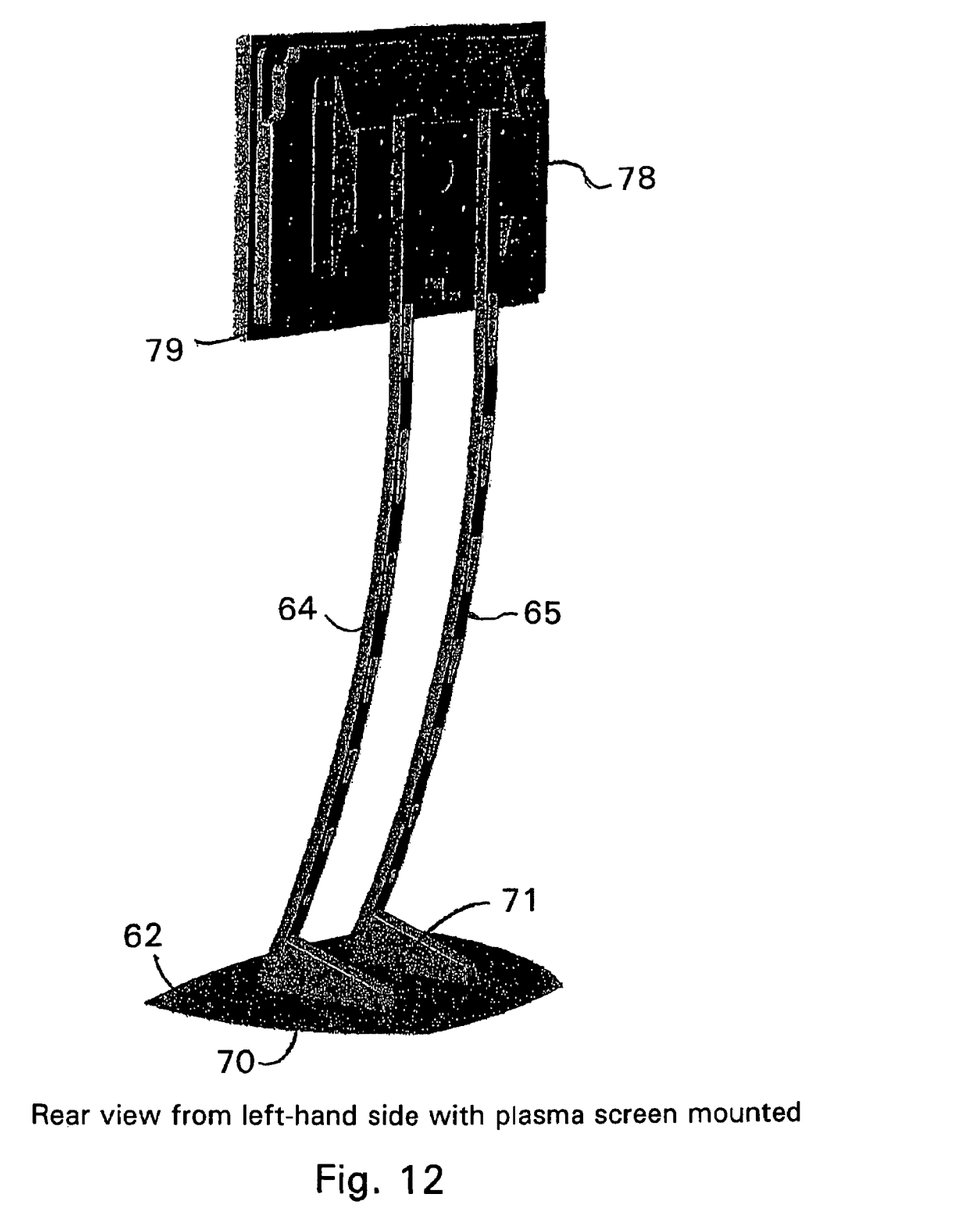
FIG. 12 is a rear view of the stand of FIGS. 6 to 10 with a display screen mounted on it.

Turning now to FIGS. 9 and 12 the column 64 (65) has in its rear wall 72 (73) a sequence of apertures 74A-G (75A-G) along the length of the column 64 (65) to enable one or more power cables to be readily inserted into and drawn internally along the column 64 (65) so as to extend within the spine from entry aperture 74A (75A) adjacent the integral foot 70 (71) up the column 64 (65) to a terminal block 77 in the location region 63. In this embodiment end 70A (71A) of the integral foot 70 (71) is open and can provide a further possible entry point for cabling.

In this case the terminal block 77 provides individual power sockets. A similar path can be used to provide a route for data or other signal carrying cables which can enter at the entry aperture 74A (75A) or can enter at some intermediate point in the length of the column 64 (65) (such as from equipment mounted on a shelf described hereafter in connection with FIG. 11).

Figure 11:
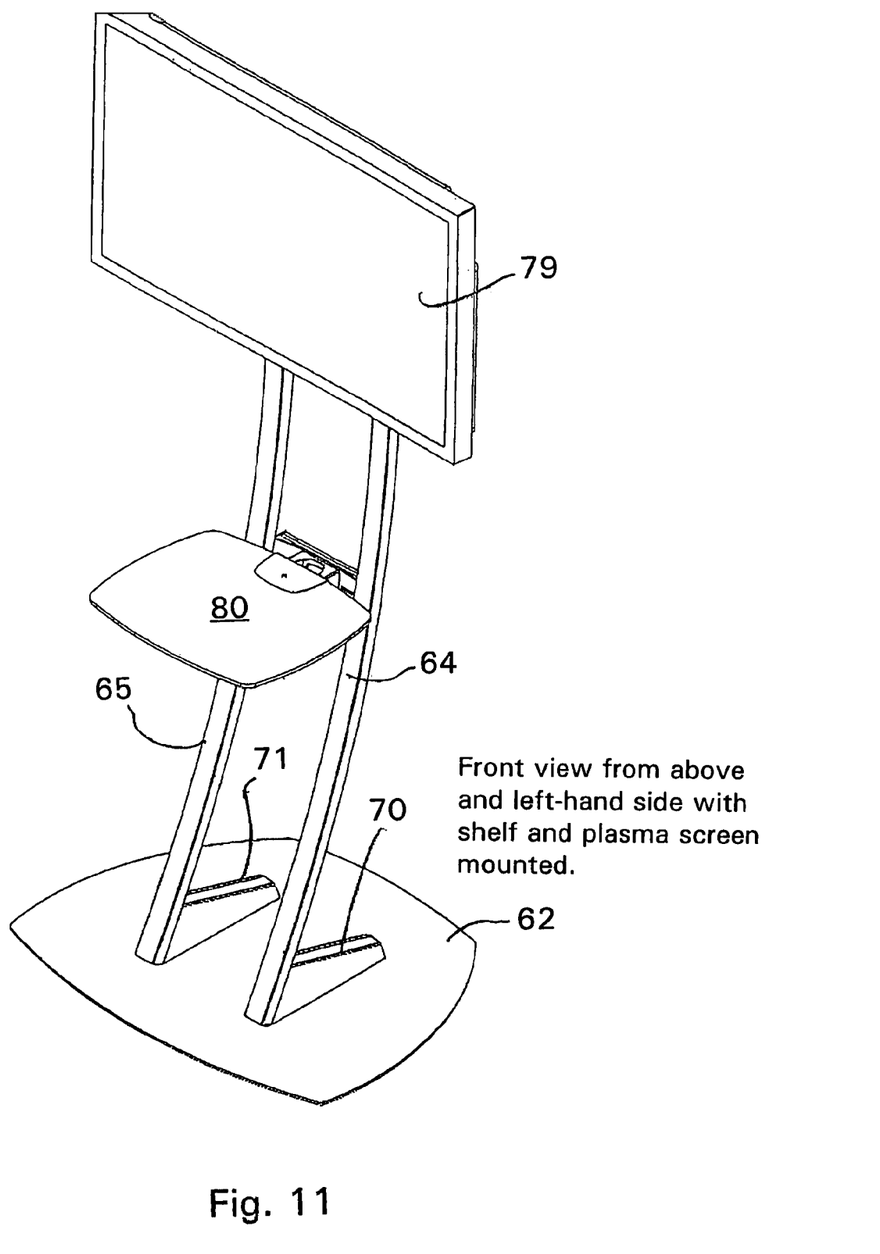
FIG. 11 is a view from the front of the stand shown in FIGS. 6 to 10 with equipment mounted on it.

FIG. 11 shows the stand of FIGS. 6-10 when equipped with a plasma screen 79 (see also FIG. 12) and a shelf 80 secured by clamp 81 to a mounting bracket 82. In this embodiment the bracket is attached to the columns 64 (65) by means of apertures in the sequence 74A-G (75A-G). The shelf 80 is used for an electronic unit (such as a video recorder) used in combination with screen 79.

FIG. 12 shows a mounting plate 78 secured to the columns 64 (65) in the location region 63. The mounting plate 78 is selected so as to accommodate the plasma screen 79 to be used.

In this second embodiment the floor mount 62 is a flat plate which is readily slid over smooth and/or uniform surfaces. The dimensions of the floor mount 62 and the curvature of columns 64 (65) is selected to ensure that with a given plasma screen 79 in place the center of gravity of the screen/column combination lies well within the plan area of the floor mount so as to provide for a stable configuration in use.

INDUSTRIAL APPLICABILITY

The two embodiments show freestanding columns of striking appearance for use with types of audio/visual equipment. Examples of display units are shown but the stands could be used for other equipment requiring an elevated position such as a loud speaker or array of speakers. In use either of the stands provides for equipment to be connected to one or more cables. These can reach the stand over surrounding ground, floor or carpet and enter the column at a low point, pass up the column to a socket or other connection arrangement in the vicinity of the region of the unit mounted at the top of the stand. This provides for a tidy appearance, The stands also provide for the ready mounting of additional equipment to be used with a display unit as shown located on the upper part of the stand.

The invention claimed is:

1. A stand comprising:
   a floor mount; a location means for a unit to be supported; and at least one column extending between the floor mount to which the column is attached by a first attachment and the location means which is attached to, or integral with, an upper region of the at least one column; the column having a longitudinal axis which is curved relative to a straight line extending between the first attachment and the location means; the at least one column comprising in combination;
   a front panel extending between floor mount and the location means and reducing in horizontal cross-section in passing upwardly from the floor mount to the location means; the front panel having a longitudinal axis which is curved relative to a straight line extending between the first attachment and the second attachment;
   a hollow spine of U-section channel attached to the front panel such that the front panel serves to close the U-section so that the front panel and the hollow spine in combination provide for the column to be substantially symmetrical about the longitudinal axis of the front panel; the hollow spine having a cross-section in the region of the floor stand which is greater than the cross-section of the spine in the region of the location means; the at least one column serving to transmit loads applied to the stand by way of the location means to the floor mount; the at least one column comprising a hollow channel substantially symmetrical about the longitudinal axis of the front panel; and a hollow spine having a cross-section in the region of the floor stand which is greater than the cross-section of the spine in the region of the location means.

2. The stand according to claim 1, wherein the at least one column has a sequence of apertures along at least part of the length of a wall of the column channel to enable a cable to be readily inserted into and drawn along the channel so as to extend within the column from an entry into the column by way of an aperture in the sequence in the vicinity of the floor mount and to pass out of the column by way of an aperture in the sequence in the vicinity of the location means so as to provide for the cable a shrouded path for data or power cable within the at least one column having a sequence of apertures as aforesaid.

3. The stand according to claim 1, wherein there is provided an the column in the vicinity of the location a coupling means including a socket or other supply termination for a power supply and/or a data coupling to enable a unit to be attached to the locating means can be demountably attached to a power or data supply.

4. The stand according to claim 1, wherein the coupling is fed power and/or data by way of at least one cable extending from the coupling and within the column.

5. The stand according to claim 1, wherein the front panel incorporates at least one longitudinal slot extending through the panel; the slot having an edge on the side of the panel which extends contiguously with an outside of a side wall of the U-section channel such that a flat member inserted through the slot from the side of the panel on the opposite side to the side to which the spine is attached is enabled to pass through the slot and lie in contact with the side wall for support thereby over an extend contact area.

6. The stand according to claim 4, wherein a shelf support extends through the slot for attachment to the column; the support projecting outwardly from the front of the front panel to receive a shelf to support an item or item at a location beneath the location means.

7. The stand according to claim 1, wherein the floor mount is demountably attached to the column by the first attachment so that a floor mount having given outside dimension can only be attached to a column whose height is related to the outside dimensions of the floor mount so that the combination of the floor mount and the column can support an added display or other unit secured to the location means in a stable configuration without added support.

8. The display assembly according to claim 1, wherein the display unit is a plasma screen.

* * * * *